United States Patent

Kyogoku et al.

[11] Patent Number: 6,077,550
[45] Date of Patent: Jun. 20, 2000

[54] PROCESS FOR MAKING BREAD

[75] Inventors: Yasuhisa Kyogoku, Ami; Hideki Kawasaki, Tsuchiura; Kozo Ouchi, Hasuda, all of Japan

[73] Assignee: Kyowa Hakko Kogyo Co., Ltd., Tokyo, Japan

[21] Appl. No.: 08/953,996

[22] Filed: Oct. 20, 1997

Related U.S. Application Data

[63] Continuation of application No. 08/648,490, May 15, 1996, abandoned, which is a continuation of application No. 08/411,731, Apr. 3, 1995, abandoned, which is a continuation of application No. PCT/JP93/01091, Aug. 4, 1993.

[51] Int. Cl.$^7$ ....................................................... A21D 2/00
[52] U.S. Cl. ................................. 426/19; 426/27; 426/61; 426/62; 426/94; 426/549
[58] Field of Search ................................. 426/19, 27, 62, 426/549, 60; 435/61, 94, 255.2, 255.21

[56] References Cited

FOREIGN PATENT DOCUMENTS

0487878A1  10/1991   European Pat. Off. .
WO 93/01724  2/1993   WIPO .

*Primary Examiner*—Lien Tran
*Attorney, Agent, or Firm*—Antonelli, Terry, Stout & Kraus, LLP

[57] ABSTRACT

A process for making bread characterized in that a yeast of the genus Saccharomyces which exhibits cold-sensitive fermentation is added to a dough.

3 Claims, No Drawings

PROCESS FOR MAKING BREAD

This application is a continuation application of application Ser. No. 08/648,490, filed May 15, 1996 now abandoned, which application is a continuation application of application Ser. No. 08/411,731, filed Apr. 3, 1995 (now abandoned) which application is a continuation of PCT application No. PCT/JP93/01091 filed Aug. 4, 1993.

TECHNICAL FIELD

This invention relates to a process for making bread being excellent in the specific volume, etc.

BACKGROUND OF THE INVENTION

In the bread-making trade, freeze-storage dough (frozen dough) is widely used as a means for the rationalization of production. Very high energy costs are required for freezing, freeze-storage, freeze-transportation, thawing, etc. In order to reduce these energy costs, a dough which is capable of being stored through refrigeration is used [Report by Katsuro Kaitaku Chosa Kenkyu Jigyo (active development investigation project), 36–45 (1990); B & C, 26–37 (1990); Basic Knowledge for New Bread Making, 148–180 (Jul. 10, 1988, 7th edition)]. However, the dough capable of being stored through refrigeration poses a problem with respect to the storage stability of the yeast contained in the dough, because the yeast deteriorates during the long-term storage.

Further, fat and oil such as butter, margarine, etc. are folded into the dough in the production of a Danish pastry, croissants, etc., and the uniform layers of the dough and the fat and oil are indispensable to making a good product. To satisfy this requirement, the folding of the fat and oil is ordinarily conducted batchwise. In each batchwise operation, increase in the temperature of the dough and the temperature of the fat and oil affects the extensions of the dough and the folded fat and oil. For this reason, a so-called retarding method is employed in which the freezing is repeatedly carried out in a refrigerator. With the ordinary yeast, fermentation proceeds, and thus the remaining activity of the yeast is lowered at the time when the fermentation is completed. In addition to the deterioration of the yeast due to the storage through refrigeration, the bread making by the retarding method involves a lot of problems.

Still further, when an ordinary yeast is contained in a refrigeration-storage dough for a domestic purpose (which is mostly packed in a sealed container), the refrigeration-storage dough has no storage stability and therefore the dough is degraded. In order to prevent the degradation of the dough, a chemical foaming agent is used instead of the yeast in many cases. Nevertheless, such a dough cannot give a satisfactory bread product in regard to flavor, appearance, etc.

DISCLOSURE OF THE INVENTION

This invention relates to a process for making bread characterized in that a yeast of the genus Saccharomyces which exhibits cold-sensitive fermentation is added to a dough.

In this invention, any yeast of the genus Saccharomyces can be used so long as it exhibits cold-sensitive fermentation.

In the present specification, the cold-sensitive fermentation means that the yeast is normally fermented at from 20 to 40° C. and shows a fermentability which is the one third or below, of that of a commercial yeast at a temperature of from −2 to 15° C. The yeast used in this invention can be obtained, for example, by the following method. Cells of a commercial yeast (for example, baker's yeast, sake yeast, wine yeast, beer yeast and yeasts of miso and soy sauce) are mutagenized by irradiating with an ultraviolet light, radiation, etc. according to a known mutation-inducing method. The mutagenized cells are contacted with antibiotics (for examples, antimycin and nystatin), and cultivated at a low temperature of from 10 to 15° C. Cells which cannot be proliferated or which exhibit very low proliferation at these low temperatures are selected (primary selection). The strains which are selected in this primary selection include strains which cannot be proliferated or which exhibit very low proliferation because of lack of fermentability or a very low level of fermentability and strains which exhibit low proliferation due to the other causes. From among these strains, selected are the strains which lack fermentability or have a very low level of fermentability at a low temperature of from 2 to 7° C. (secondary selection). Then, from among the strains selected in the secondary selection, selected are the strains which regain fermentability at a temperature of from 20 to 40° C. (tertiary selection). Finally, from among the strains selected in the tertiary selection, selected are the strains which exhibit as excellent a fermentability as the ordinary yeast under the fermentation conditions of the bread dough at a temperature of from 20 to 40° C. (quaternary selection).

A specific example of the strains thus selected is *Saccharomyces cerevisiae* RZT-3 (hereinafter referred to as "RZT-3 strain"). *Saccharomyces cerevisiae* RZT-3 was deposited on May 26, 1992 with the Fermentation Research Institute Agency of Industrial Science and Technology located at 1–3, Higashi 1-chome, Tsukuba-shi, Ibaraki-ken, 305 Japan as FERM BP-3871.

A method for obtaining RZT-3 strain is described below.

Commercial bread yeast Dia Yeast YST (made by Kyowa Hakko Kogyo Co., Ltd.; hereinafter referred to as "YST strain") is cultivated in a YPD culture medium comprising 1% of yeast extract, 2% of polypeptone and 2% of glucose at 30° C. for 12 hours, and centrifuged to collect cells. The collected cells are suspended in an aqueous solution of 0.067 M potassium dihydrogenphosphate with an absorbance of 1.0, that is, such that the number of cells being $1 \times 10^7$ per milliliter. The cell suspension is irradiated with ultraviolet light to the extent that the survival rate is from 1 to 30%, and then subjected to the primary selection.

The primary selection is conducted in the following manner. Twenty microliters of the resulting cell suspension is inoculated in 1 ml of the YPD culture medium and cultivated at 30° C. for 12 hours. After the cultivation is completed, cells are collected by centrifugation. The collected cells are cultivated in a nitrogen-free minimum culture medium comprising 0.17% of yeast nitrogen base having no amino acid and no ammonium sulfate (made by Difco) and 1% of glucose at 30° C. for 12 hours. After the cultivation is completed, the cells are re-collected by centrifugation. The collected cells are suspended in 0.9 ml of a YPD culture medium containing $1\times10^{-6}$M antimycin, and cultivated at 10° C. for 36 hours.

Further, 10 μg/ml nystatin is added to the culture, and the culture is allowed to stand at 10° C. for 2 hours. The culture is centrifuged to collect cells. The collected cells are spread on a YPD plate culture medium comprising 1% of yeast extract, 2% of polypeptone, 2% of glucose and 2% of agar, and cultivated at 30° C. for 48 hours to grow colonies. The grown colonies are selected as follows to thereby obtain RZT-3 strain. The RZT-3 strain was deposited with the Fermentation Research Institute Agency of Industrial Science and Technology on May 26, 1992 in terms of the Budapest Treaty, and has been assigned to Accession No. FERM BP-3871.

The secondary selection is conducted as follows. The colonies separated in the primary selection are transferred on to a YPG plate culture medium comprising 1% of yeast extract, 2% of polypeptone, 3% of glycerol and 2% of agar, and cultivated at 30° C. for 24 hours to grow colonies. A pigment agar culture medium comprising 0.5% of yeast extract, 1% of peptone, 10% of sucrose, 0.02% of bromocresol purple and 1% of agar is ovelayed on the colonies. The colonies are inoculated at 5° C. for from 6 to 12 hours. During this time period, the color around the colonies is observed, to select the strains having strong fermentability. That is, the strains having strong fermentability at 5° C., change in the color from purple to yellow and the strains which lack fermentability or have low fermentability, do not or slightly change in the color.

The tertiary selection is conducted as follows. The colonies selected in the secondary selection are transferred on a YPG plate culture medium, and cultivated at 30° C. for 24 hours to grow colonies. The pigment agar culture medium is overlayed on the colonies, and the colonies are cultivated at 30° C. for 2 hours. The strains having sufficient fermentability (the strains which change in the color around the colonies from purple to yellow) are selected.

The quaternary selection is conducted as follows. With respect to the strains selected in the tertiary selection, a bread dough is prepared to have the following composition by the following method. The amount of a carbon dioxide gas generated at from −2 to 40° C. is measured and employed as a criterion for determination of fermentability.

| Dough composition: | (Parts by weight) |
|---|---|
| Strong flour | 100 |
| Sugar | 15 |
| Salt | 1.2 |
| Water | 58 |
| Yeast cells obtained in Example 1 hereinafter | 3 |

Method:

Mixing (with a National complete mixer at 100 rpm for 2 minutes)
↓
Fermenting (at 30° C. for 45 minutes)
↓
Dividing (35.44 g)
↓
Allowing to stand (at 10° C. for 3 hours)
↓
Measuring the amount of the carbon dioxide gas which is generated at temperatures shown in Table 1 for 2 hours.

The amount of carbon dioxide gas generated at from −2 to 15° C. for 2 hours is measured by a method in which 35.44 g of the bread dough are packed in a 100-milliliter conical flask and the carbon dioxide gas generated is moved into a cylinder filled with a saturated NaCl aqueous solution. The amount of the carbon dioxide gas generated at from 20 to 40° C. is measured with a Fermograph (supplied by ATTO CO., LTD.). The results are shown in Table 1.

TABLE 1

| | Amount of carbon dioxide gas generated (ml) | | | | | |
|---|---|---|---|---|---|---|
| Strain | −2° C. | 0° C. | 2.5° C. | 5° C. | 10° C. | 15° C. |
| YST | 0.0 | 0.5 | 1.1 | 2.0 | 14.3 | 26.0 |
| RZT-3 | 0.0 | 0.0 | 0.0 | 0.2 | 2.9 | 7.1 |

| | Amount of carbon dioxide gas generated (ml) | | | | |
|---|---|---|---|---|---|
| Strain | 20° C. | 25° C. | 30° C. | 35° C. | 40° C. |
| YST | 65.7 | 91.7 | 145.8 | 190.9 | 211.2 |
| RZT-3 | 59.9 | 93.5 | 147.9 | 188.3 | 221.9 |

As is apparent from the table, YST strain does not substantially ferment at −2° C. and 0° C., and the ability of the fermentation is gradually increased at 2.5° C. or higher. Meanwhile, RZT-3 strain does not substantially ferment at from −2 to 5° C., and the ability of fermentation of RZT-3 strain is approximately one third of that of the YST strain even at 15° C., and is approximately the same as that of the YST strain at 20° C. or higher.

In the present invention, as the dough to which yeast is added, any dough can be used, so long as the dough is obtained by adding water to a wheat flour and a salt. Specifically, a dough which is obtained by adding, if necessary, sugar, shortening, butter, skim milk, yeast food and egg to raw materials such as a wheat flour, a salt and fat and oil, is mentioned, and kneading the mixture together with water.

A method for making bread is described hereinafter.

Cultivation of bread yeast

Yeast cells which are suitable for making bread can be obtained by cultivating yeast in an ordinary culture medium containing a carbon source, a nitrogen source, an inorganic substance, amino acid and vitamin under aerobic conditions while adjusting the temperature to from 27 to 32° C., recovering the cells and washing the recovered cells.

The carbon source to be contained in the culture medium includes, for example, glucose, sucrose, starch hydrolyzate and molasses. Blackstrap molasses is the most preferable.

The nitrogen source to be contained in the culture medium includes, for example, ammonia, ammonium chloride, ammonium sulfate, ammonium carbonate, ammonium acetate, urea, yeast extract and corn steep liquor.

The inorganic substance includes, for example, magnesium phosphate and potassium phosphate. The amino acid includes, for example, glutamic acid. The vitamin includes, for example, pantothenic acid and thiamine. Feeding culture is suitable in the cultivation.

Method for making bread

The bread dough to be used is obtained by adding, to a wheat flour, a salt, fat and oil, water, the above-obtained yeast and, if necessary, sugar, shortening, butter, skim milk, yeast food and egg. Bread in the form of a loaf of bread, a bun or the like can be made according to the typical method, for example, the straight dough method and the sponge and dough method. The former is a method in which all the raw materials are mixed from the beginning. The latter is a method in which yeast and water are first added to a part of wheat flour to form a sponge mix, and after the completion of the sponge fermentation, the remaining raw materials and mixed with the sponge fermentation.

Specifically, in the straight dough method, all the raw materials are kneaded, then fermented at from 25 to 30° C., divided, benched, molded and packed. The resulting product is subjected to proofing (at form 35 to 42° C.), and then baked (at from 200 to 240° C.).

Separately, in the sponge and dough method, water is added to approximately 70% of the wheat flour used, yeast and yeast food, and the mixture is kneaded and fermented at from 25 to 35° C. for from 3 to 5 hours. Thereafter, the remaining raw materials (wheat flour, water, salt and shortening) are thereto. The mixture is kneaded, divided, benched, molded and packed. The resulting product is subjected to proofing (at from 35 to 42° C.) and then baked (at from 200 to 240° C.).

A Danish pastry, croissants, etc. are made, for example, in the following manner.

Water is added to raw materials, that is, a wheat flour, a salt, the above-obtained yeast, sugar, shortening, egg and skim milk, and the mixture is kneaded to form a dough. Then, fat and oil such as butter, margarine, etc. are put into the dough. Rolling and folding are repeated to make multiple layers of the dough and the fat and oil. The step of folding the fat and oil when the dough is prepared, is called rolling-in. The rolling-in can be accomplished by either of two methods. In one method, the raw materials are kneaded at a low kneading temperature of approximately 15° C. without cooling until the intended number of layers are given. In the other method, during the folding, the difference between the extension of the dough and the extension of the fat and oil due to the increase in the temperature of dough and the fat and oil damages uniformity of the layers. The other method is the so-called retarding method in which the cooling is conducted several times in a refrigerator or a freezer for the purpose of restoring the properties of the dough during the operation.

The obtained dough is rolled, divided, molded and packed. The resulting dough is subjected to proofing (at from 30 to 39° C.), and then baked (at from 190 to 210° C.). Best Mode for Carrying out the Invention This invention is illustrated specifically with the use of the following Examples.

EXAMPLE 1

Cultivation of bread yeast

One platinum loopful of RZT-3 cells was inoculated in a 300-milliliter conical flask containing 30 ml of a YPD culture medium, and cultivated at 30° C. for 24 hours. After the cultivation was completed, the total amount of the culture was put into a 2-liter conical flask equipped with a baffle and containing 270 ml of a molasses culture medium comprising 3% of molasses, 0.193% of urea, 0.046% of potassium dihydrogenphosphate and 2 drops of a deformer, and cultivated at 30° C. for 24 hours with shaking. After the cultivation was completed, the cells were collected by centrifugation. The cells were washed twice with deionized water. Subsequently, the moisture content was removed to an absorptive ceramic plate to obtain the cells.

Also, YST cells were subjected to the same procedure as the RZT-3 cells.

The thus-obtained yeast cells were used to make bread. Making bread

A loaf of bread was obtained from the following dough composition and by the following method.

| Dough composition: | (parts by weight) |
|---|---|
| Strong flour | 100 |
| Sugar | 5 |
| Salt | 2 |
| Shortening | 5 |
| Yeast food (Pandia C-500 made by Kyowa Hakko Kogyo Co., Ltd.) | 0.1 |
| Yeast cells (RZT-3 strain or YST strain) | 2 |
| Water | 66 |
| Method: | |
| Mixing | |
| [low speed (100 rpm) | 3 minutes |
| medium speed (190 rpm) | 6 minutes |
| high speed (290 rpm) | 5 minutes |
| Kneading temperature (28° C.) | |
| Dividing (450 g) | |
| Storing (5° C., 7 days) | |
| Benching (room temperature, 15 minutes) | |
| Molding (molder) | |
| Proofing (40° C., 90% RH, 75 minutes) | |
| Baking (220° C., 25 minutes) | |

The fermentability before and after refrigeration (storage at 5° C. for 7 days) was measured by a Fermograph using 30 g of the dough, and the total amount (ml) of the carbon dioxide gas generated at 30° C. for 2 hours was shown. The refrigeration resistance was calculated by the following equation.

$$\text{Refrigeration resistance (\%)} = \frac{\text{Fermentability (ml) after refrigeration}}{\text{Fermentability (ml) before refrigeration}} \times 100$$

The results are shown in Table 2.

TABLE 2

| Strain | Fermentability before refrigeration (ml) | Fermentability after refrigeration (ml) | Refrigeration resistance (%) |
|---|---|---|---|
| YST | 114.6 | 40.0 | 34.9 |
| RZT-3 | 108.9 | 99.7 | 91.6 |

The specific volume of the obtained loaf of bread was measured by a rape seed displacement method. Further, appearance and crumb grain were observed. The results are shown in Table 3.

TABLE 3

| Strain | Specific volume (cm³/g) | Evaluation Appearance | Crumb grain |
|---|---|---|---|
| YST | 3.19 | x | x |
| RZT-3 | 4.79 | ⊚ | ⊚ |

Note:
Evaluation standard
⊚: good
x: poor

A butter roll was obtained according to the following dough composition and by the following method.

| Dough composition: | (parts by weight) |
|---|---|
| Strong flour | 80 |
| Soft flour | 20 |
| Sugar | 10 |
| Salt | 1.8 |
| Salt-free butter | 15 |
| Skim milk | 3 |
| Whole egg | 8 |
| Yeast food (Pandia C-500) | 0.1 |
| Yeast cells (RZT-3 strain or YST strain) | 3 |
| Water | 54 |
| Method: | |
| Mixing | |
| [low speed (100 rpm) | 10 minutes |
| medium speed (190 rpm) | 5 minutes |
| high speed (290 rpm) | 30 seconds |
| Kneading temperature (26° C.) | |
| Dividing (50 g) | |
| Benching (room temperature, 15 minutes) | |
| Molding (molder) | |
| Storing (5° C., 1, 4 and 7 days) | |
| ↓ | |
| Proofing (36° C., 85% RH, 40 minutes) | |
| Baking (210° C., 12 minutes) | |

In accordance with Example 1, the fermentability and the specific volume were measured, the refrigeration resistance was calculated, and the appearance and the crumb grain were observed. The results are shown in Tables 4 and 5.

TABLE 4

| | Fermentability (ml) | | | | Refrigeration resistance |
|---|---|---|---|---|---|
| Strain | Before refrigeration | 1st day | 4th day | 7th day | (after 7 days) (%) |
| YST | 130.7 | 134.8 | 105.0 | 33.8 | 25.6 |
| RZT-3 | 121.4 | 133.8 | 112.6 | 104.8 | 86.3 |

TABLE 5

| | Specific volume (cm³/g) | | | Evaluation after 7 days | |
|---|---|---|---|---|---|
| Strain | 1st day | 4th day | 7th day | Appearance | Crumb grain |
| YST | 4.38 | 4.09 | 2.86 | x | x |
| RZT-3 | 4.98 | 4.67 | 3.87 | ⊚ | ⊚ |

EXAMPLE 3

A Danish pastry was obtained according to the following dough composition and by the following method (retarding method).

| Dough composition: | (parts by weight) |
|---|---|
| Strong flour | 70 |
| Soft flour | 30 |
| Sugar | 10 |
| Salt | 1.2 |
| Shortening | 6 |
| Whole egg | 10 |
| Yeast food (Pandia C-500) | 0.1 |
| Yeast cells (RZT-3 strain or YST strain) | 6 |
| Water | 50 |
| Folding butter | 50 |
| Method: | |
| Mixing | |
| [low speed (100 rpm) | 3 minutes |
| medium speed (190 rpm) | 8 minutes |
| high speed (290 rpm)] | 1 minute |
| Kneading temperature (22° C.) | |
| Dividing (1,000 g × 2) | |
| Retarding (−20° C., 30 minutes) | |
| Rolling-in [folding into three layers, twice (folding butter: 50% per the wheat flour)] | |
| Retarding (5° C., 60 minutes) | |
| Rolling (folding into three layers, once, rolling at 4 mm) | |
| Dividing and molding [50 g, rolled shape (for fermograph, 30 g)] | |
| Storing (5° C., 1, 4 and 7 days) | |
| ↓ | |
| Proofing (35° C., 75% RH, 70 minutes) | |
| Baking (200° C., 12 minutes) | |

The dough was divided, molded and then directly baked without being stored, or the dough was divided, molded, stored in a refrigerator of 5° C. for 1, 4 and 7 days, and then baked.

In accordance with Example 1, the fermentability and the specific volume were measured, the refrigeration resistance was calculated, and the appearance and the crumb grain were observed. The results are shown in Tables 6 and 7.

TABLE 6

| | Fermentability (ml) | | | | Refrigeration resistance |
|---|---|---|---|---|---|
| Strain | Before refrigeration | 1st day | 4th day | 7th day | (after 7 days) (%) |
| YST | 207.3 | 208.8 | 135.5 | 61.7 | 30.1 |
| RZT-3 | 204.2 | 200.2 | 161.1 | 161.9 | 82.3 |

TABLE 7

| Strain | Specific volume (cm³/g) | | | | Evaluation | | | | | | | |
|---|---|---|---|---|---|---|---|---|---|---|---|---|
| | | | | | Immediately | | 1st day | | 4th day | | 7th day | |
| | Just after baking | 1st day | 4th day | 7th day | appearance | crumb grain | appearance | crumb grain | appearance | crumb grain | appearance | crumb grain |
| YST | 5.20 | 4.99 | 3.86 | 3.40 | ⊚ | ⊚ | o | o | x | x | x | x |
| RZT-3 | 5.30 | 5.20 | 5.10 | 4.85 | ⊚ | ⊚ | ⊚ | ⊚ | ⊚ | ⊚ | o | o |

Note:
Evaluation
⊚: good
o: fair
x: poor

EXAMPLE 4

A butter roll was obtained according to the following dough composition and by the following method.

| Dough composition: | (parts by weight) |
|---|---|
| Strong flour | 80 |
| Soft flour | 20 |
| Sugar | 10 |
| Salt | 1.8 |
| Salt-free butter | 15 |
| Skim milk | 3 |
| Whole egg | 8 |
| Yeast food (Pandia C-500) | 0.1 |
| Yeast cells (RZT-3 strain or YST strain) | 2.5 |
| Water | 54 |

Method (1) The raw materials of the above-mentioned dough composition were mixed at low speed (100 rpm) for 10 minutes, at medium speed (190 rpm) for 5 minutes and at high speed (290 rpm) for 30 seconds. The kneading temperature was 26° C.

(2) The obtained dough was divided (50 g), then benched at room temperature for 15 minutes, and molded.

(3) After the molding was completed, the dough was packed in a sealed container (filled with a carbon dioxide gas), and immediately stored in a refrigerator of 5° C. for from 1 to 5 weeks.

(4) After the storage, the dough was subjected to proofing at 36° C. for 30 minutes, and baked at 210° C. for 12 minutes.

The specific volume of the obtained butter roll is Table 8.

TABLE 8

| Strain | Storage period (weeks) | | | | |
|---|---|---|---|---|---|
| | Just after baking | 1 | 2 | 3 | 5 |
| YST | 4.72 | 2.86 | 2.30 | 2.25 | 2.11 |
| RZT-3 | 4.82 | 4.22 | 3.88 | 3.69 | 3.32 |

What is claimed is:

1. In a method for making bread, the improvement comprising adding a yeast of *Saccharomyces cerevisiae* RZT-3(FERM BP-3871) exhibiting cold-sensitive fermentation to a dough.

2. A dough which contains a yeast of *Saccharomyces cerevisiae* RZT-3(FERM BP-3871) exhibiting cold-sensitive fermentation.

3. A method according to claim 1, wherein said yeast of *Saccharomyces cerevisiae* RZT-3 is cultured in molasses.

* * * * *